United States Patent [19]

Pratolongo

[11] Patent Number: 4,869,160
[45] Date of Patent: Sep. 26, 1989

[54] APPARATUS FOR THE FAST COOKING OF PASTA AND THE LIKE

[75] Inventor: Modesto Pratolongo, Milan, Italy

[73] Assignee: Electronics For Industry, Ltd., England

[21] Appl. No.: 123,110

[22] PCT Filed: Feb. 18, 1987

[86] PCT No.: PCT/IT87/00015
§ 371 Date: Oct. 19, 1987
§ 102(e) Date: Oct. 19, 1987

[87] PCT Pub. No.: WO87/04910
PCT Pub. Date: Aug. 27, 1987

[30] Foreign Application Priority Data

Feb. 18, 1986 [IT] Italy .................. 19447 A/86

[51] Int. Cl.$^4$ .............. A47J 27/04; A47J 27/16; A47J 27/21
[52] U.S. Cl. .................. 99/330; 99/331; 99/352; 99/403; 99/407
[58] Field of Search .......... 99/330, 331, 352, 355, 99/359-360, 403, 404, 407, 426, 339, 332, 410; 426/523, 402, 462, 507; 126/20, 20.1, 20.2; 221/251, 293, 298

[56] References Cited

U.S. PATENT DOCUMENTS

| 3,592,668 | 7/1971 | Denk | 99/355 |
| 3,937,135 | 2/1976 | Pratolongo | 99/352 |
| 4,543,878 | 10/1985 | Luchetti | 99/330 |
| 4,635,812 | 1/1987 | Mueller | 99/330 X |
| 4,732,080 | 3/1988 | Vita | 99/407 |

Primary Examiner—Timothy F. Simone
Attorney, Agent, or Firm—Darby & Darby

[57] ABSTRACT

In a process for the fast cooking of pasta and the like, a metered quantity of food is introduced from the top, into a containing chamber 8 embodied in a broiler 7, in said containing chamber 8 pasta being homogeneously distributed. Subsequently water at high pressure and temperature coming from the boiler is also introduced into the containing chamber. The expansion of water in the containing chamber takes place without forming overheated vapor so that water can homogeneously impregnate and soften pasta within a period shorter than 40 seconds. Pasta is then conveyed into a pause chamber 9 where cooking goes on for a period shorter than 40 seconds. The last cooking operation takes place in the consuming vessel 76 where pasta is finally transferred, while the final consumer is putting dressing thereon.

13 Claims, 3 Drawing Sheets

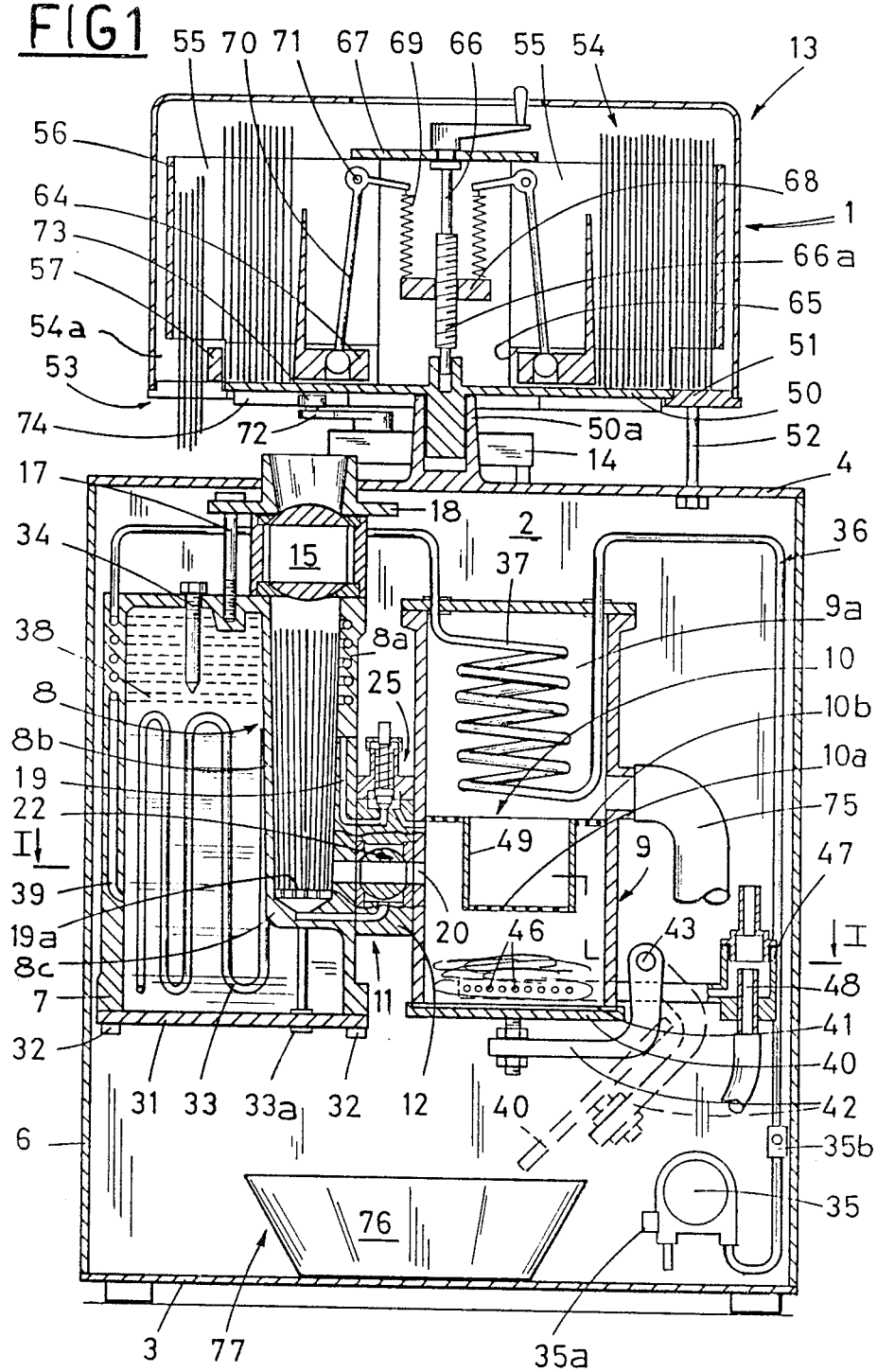

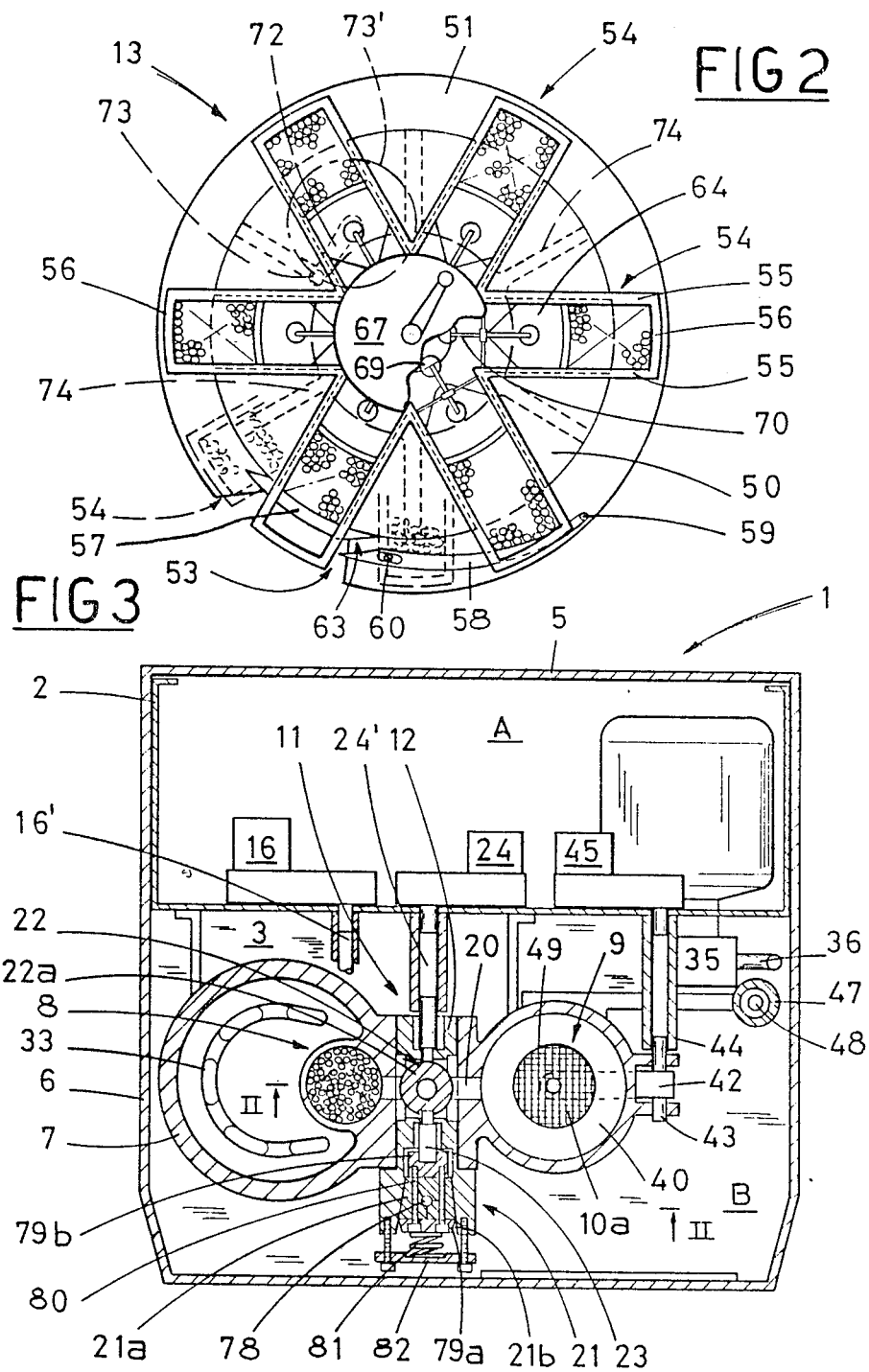

APPARATUS FOR THE FAST COOKING OF PASTA AND THE LIKE

BACKGROUND OF THE INVENTION

1. Field of the Invention

The present invention pertains to a process for the fast cooking of pasta and the like, in particular of dry "spaghetti" and other kinds of filamentary pasta to be consumed immediately and to the automatic apparatus to put the process into practice.

2. Prior Art

In known apparatus food is usually cooked during two steps, the first one taking place in a so-called cooking or pre-cooking chamber which is hydraulically brought into contact with a boiler to receive hot water therefrom in order to carry out the cooking. Then food is discharged into an expansion chamber, under atmospheric pressure, in which cooking terminates during a period substantially as long as the first step. Food ready to be consumed is then unloaded into an appropriate earthenware vessel put at the outside.

This process however is adapted to give an acceptable cooking degree only if it takes place within a period of 10 to 20 seconds longer than one minute. From a commercial standpoint this time is too long and it is difficult to reduce it owing to an improper operation during the first cooking step. This is mainly due to the high differential values in pressure and temperature existing between boiler and cooking chamber that give rise to the formation of dry and/or overheated vapour while water is introduced into said cooking chamber The presence of overheated vapour alters the molecular structure of gluten present in the pasta and it also makes the pasta surface immediately impervious to penetration by water, which remarkably hinders the absorption of water by the latter during the different cooking steps. It is clear that in this way the cooking operation is delayed and in many cases even endangered.

SUMMARY OF THE INVENTION

An object of the invention is to eliminate the above drawbacks by providing a process and an apparatus that, by suitable devices, are adapted to allow pasta to be cooked in very reduced times, shorter than one minute.

Another object of the invention is to provide an apparatus having a simplified structure as compared to that of known apparatus.

These objects are substantially achieved, in accordance with the process in reference, by the use of an appropriate thermodynamic process initially providing a moderate-speed expansion of the water coming from the boiler and flowing into a pasta-containing chamber, in order to ensure a quick and homogeneous heat exchange between water saturated vapour and food. The true cooking of pasta takes place during a controlled pause step which is partly carried out in a chamber under atmospheric pressure and partly in the consumer's vessel when withdrawn from the apparatus and while dressing is applied.

The apparatus adapted to carry out this process and to meet the proposed requirements uses a low-evaporation-index boiler, into which is partly plunged and penetrated a containing chamber where the heat exchange between water, vapours flowing thereinto and food takes place.

Advantageously the apparatus does not use any electric valve but a new type of combined-effect valve mechanically controlling the introduction of water and vapour into a containing chamber, the discharging of the softened food into a pause chamber and the thermal expansion of the water contained in the boiler by effect of heat applied in order to heat said water.

BRIEF DESCRIPTION OF THE DRAWINGS

Further features and advantages of the invention will become more apparent from the detailed description of a preferred embodiment of a process for the fast cooking of pasta and the like and of an apparatus for putting the process into practice, according to the present invention, given hereinafter by way of non-limiting example with reference to the accompanying drawings in which:

FIG. 1 is a diagrammatic view of the apparatus in question sectioned along different vertical planes;

FIG. 2 is a top view of the metering device for said apparatus;

FIG. 3 is a sectional view of the apparatus taken along line I—I of FIG. 1;

DESCRIPTION OF THE PREFERRED EMBODIMENT

Figure 4:
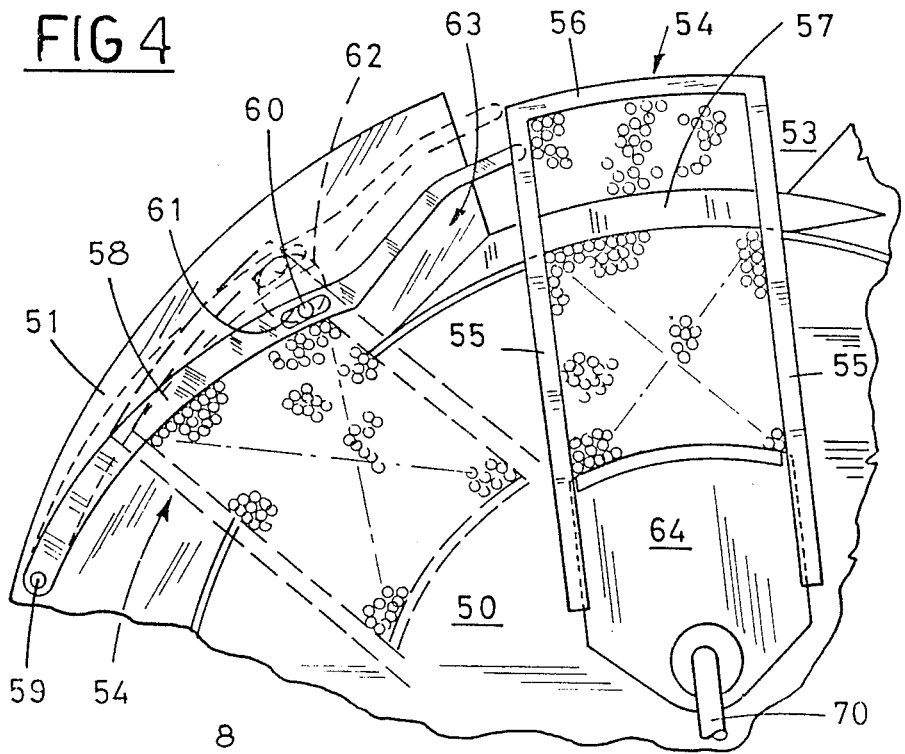
FIG. 4 is an interrupted view on an enlarged scale of the metering device seen in FIG. 2.

Referring to the drawings, reference numeral 1 globally denotes an apparatus for the fast cooking of pasta and the like according to the present invention.

Apparatus 1 is divided into two distinct bodies:

one body A including a box-shaped support 2, a base plate 3, an upper plate 4 and an openable rear cover 5; all electric components of apparatus 1 are enclosed in body A;

a second body B including a box-shaped envelope enclosing all mechanical members forming the apparatus in itself, i.e.: a boiler 7; a containing chamber 8 incorporated within boiler 7; a pause chamber 9 divided by a diaphragm filter 10 defining, at the upper part thereof, an expansion portion 9a in the pause chamber 9; a combined-effect valve 11 enclosed between boiler 7 and pause chamber 9. The boiler 7, chamber 9 and combined-effect valve 11 interposed therebetween are integral to one another, for example through screw-threaded elements, and are mounted on support 2 by two supporting elements 13 acting on boiler 7 and on pause chamber 9 respectively. Box-shaped envelope 6 is preferably designed to be removable so that an easy cleaning of the members contained in body B is possible.

A metering device 13 is disposed above the upper plate 4 and is interlocked to a first reduction means 14 shown diagrammatically and fastened, at the upper part thereof, to the upper plate 4.

The containing chamber 8 extends vertically inside boiler 7 and has one wall portion 8a in common with the body of boiler 7 and a second wall portion 8b extending inside said boiler. The second wall portion 8b advantageously has a thinner thickness than the first wall portion 8a which means a thinner thickness than the body of boiler 7. In this way the different factors of liquid-to-solid and solid-to-solid thermal conductivity are harmonized.

In addition, said containing chamber 8 is intended to slightly have the form of a truncated cone the smaller base of which faces downwardly and is closed by a base wall 8c spaced apart from the boiler 7 bottom by a distance equal to one fifth of the whole height of boiler 7. By virtue of this expedient the containing chamber 8 does not suffer from the temperature variations taking place in the lower part of boiler 7.

The inner height of the containing chamber 8 is preferably 10 to 15% greater than that of the food (spaghetti) to be contained and the inner diameter thereof is substantially identical to the diameter of the section occupied by spaghetti when introduced into the containing chamber 8.

Above the containing chamber 8 is located a closing ball-shaped valve 15 which is normally closed and operable, through a movement-transmitting shaft 16', by control means consisting of a second reduction means 16 fastened to support 2. In greater detail, the closing valve 15 is coaxially fastened through screws 17 between a funnel-shaped flange 18 and an aperture provided on the upper part of the containing chamber 8.

The containing chamber 8 communicates with boiler 7 via an outflow duct 19 partly shown by a section plane offset with respect to the main section plane in FIG. 1. Outflow duct 19 extends from the upper end of boiler 7 and leads off to the bottom of the containing chamber 8 across a diffuser 19a located therein.

The containing chamber 8 further communicates with a pause chamber 9 through a passage port 20 extending from the chamber 8 base. Along said outflow duct 19 and passage port 20 a first shutoff valve 21 and a second shutoff valve 22 are respectively interposed, both embodied in the combined-effect valve 11. In greater detail, both shutoff valves 21 and 22 are designed to have respective movable parts 21a and 22a rotatably and sealingly accommodated in respective housings located in the valve body 12 and engaged with each other by a joint 23. Shutoff valves 21 and 22 can be simultaneously operated by a third reduction means 24 through a movement-transmitting shaft 24'. Valves 21 and 22 act according to opposite shutoff steps, that is they stop the fluid communication along the outflow duct 19 when passage port 20 is open and viceversa.

In an original manner the movable part 21a of the first shutoff valve 21 is essentially comprised of a frusto-conical element, preferably made of charged PTFE rotatably accommodated in a housing 21b of truncated conical form located in the valve body 12 across the outflow duct 19 which crosses the valve body 12. The frusto-conical element 21a is pierced by a transverse through hole 78 intended to be disposed in alignment with the outflow duct 19 in order to open the fluid communication along the same.

Figure 5:
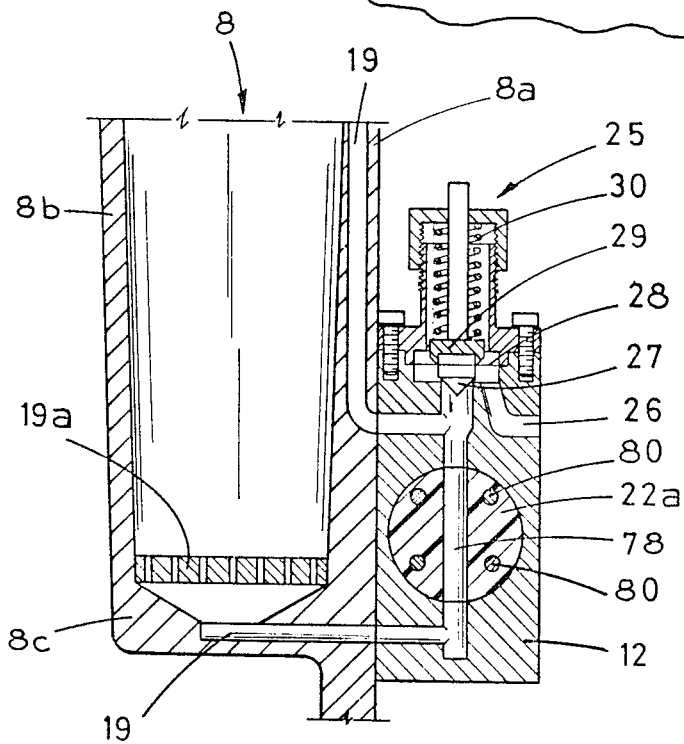
FIG. 5 shows the combined-effect valve fitted for the apparatus in question on an enlarged scale and sectioned along line II—II of FIG. 3.

Furthermore, two presser elements 79a and 79b are associated with the frusto-conical elements 21a and they act on the bigger and smaller base thereof respectively. At least two screw threaded tie rods 80 longitudinally cross the frusto-conical element 21a at diametrically opposed positions thereof and act on presser elements 79a and 79b tending to move them closer to each other. Frusto-conical element 21a is thrusted into housing 21b by a compression spring 81 between the bigger base of the frusto-conical element 21a and a locating plate 82 fastened to the valve element 12. In addition, a safety valve 25 (FIG. 5) is housed in the valve body 12 and a discharge duct 26 is associated therewith; said discharge duct 26, starting from the outflow duct 19, makes boiler 7 communicate with pause chamber 9. Safety valve 25 is substantially comprised of a pin obturator 27, preferably made of charged PTFE integral to a thin diaphragm 28 and incapsulated in a stiff presser element 29 on which a precisely regulated spring 30 acts. Safety valve 25 opens when, due to thermal expansion of water or for any other reason, pressure inside boiler 7 goes beyond a predetermined safety value.

Boiler 7, closed at the bottom by a flanged cover 31 fastened thereto by means of bolts 32, is provided with an electrical resistor for heating purposes 33, the terminals 33a of which are connected to a suitable operation switch, not shown. Said switch is interlocked to a thermostat 34 and an operation circuit for a pump 35 sending water from an external source to boiler 7.

In greater detail, pump 35 is in communication with boiler 7 through a delivery pipe 36 along which a first pre-heating section 37 and a second pre-heating section 38 are formed. The first pre-heating section is in the form of a coil pipe and extends at the upper part of the pause chamber 9, that is in the expansion chamber 9a. The second pre-heating section 38, in the form of a coil pipe as well, is incorporated in the boiler 7 walls close to the upper part thereof. The water crossing it is therefore heated by withdrawing heat in excess from the upper part of boiler 7 where heat tends to store. Water, after crossing the second pre-heating section 38 is then discharged, through an outlet duct 39, into the lower part of boiler 7 in order to make temperature of water contained in boiler 7 as much homogeneous and constant as possible.

An overpressure valve 35a and a non-return valve 35b are associated with pump 35; they ensure a constant water pressure along pipe 38 and, as a result, in boiler 7.

Pause chamber 9 is of cylindrical form and is closed at the bottom by a movable cover 40 ensuring the tightness thereof by means of a flat seal 41. Cover 40 is fastened to a cranked arm 42 fulcrumed on a pivot pin 43 operated, through a movement-transmitting shaft 44, by a fourth reduction means 45, fastened to support 2 as well. Close to the base of the pause chamber 9 there is a plurality of drainage holes 46, hydraulically communicating with a water trap 47 along the vertical axis of which a water gauge pipe can be moved; said pipe, communicating with the outside, is adapted to suitably adjust the excess water in the pause chamber 9 during the cooking operation.

The diaphragm filter 10 is comprised of a substantially cylindrical diffuser 49 standing upright in front of the passage port 20. Preferably diffuser 49 should have a diameter equal to one half the diameter of the pause chamber 9. The diffuser base is closed by one network-structured filtering element 10a. Around the top of diffuser 49 there is a second filtering element 10b the outer edge of which is linked to the inner wall of pause chamber 9 above the passage port 20. Obviously it is also possible to provide for a single filtering element crossing chamber 9 according to a single plane disposed above the passage port 20 and dissociated from diffuser 49.

The metering device 13 is substantially comprised of a substantially circular rotatable base 50 rotatably engaged about a vertical axis within a housing 50a integral to the upper plate 4. Base 50 is also fit for freely rotating within a ringlike element 51 secured to the upper plate 4 by spacing screws 52. The fixed ring-like element 51 is disposed so that it is coplanar with the rotatable base 50 and is provided with an unloading opening 53 located above the closing valve 15. Preferably the unloading opening 53 is out of alignment with the projection of the vertical axis of the containing chamber 8, having a lag of about 10° (see FIG. 2). In order to emphasize the presence of the unloading opening 53, the lefthand part of the metering device 13 in FIG. 1 has been sectioned along a plane which is angularly offset with respect to the main section plane of FIG. 1. Provision is made for a plurality of rectangular containing compartments 54 (six in the drawing) integrally disposed on the rotatable base 50; they are open at the top and project beyond the perimeter of the rotatable base 50 by a portion slightly smaller than the width of the fixed ringlike element 51. Each compartment 54 has two side walls 55 connected, on the side of the fixed ringlike element 51, to the opposed ends of a circumferential wall 56.

Side walls 55 and walls 56 are cut over the whole portion projecting from the perimeter of base 50 according to a plane parallel to the plane of the rotatable base 50, so that they give rise to open areas 54a in the lower part of each compartment 54 and above the fixed ringlike element 51.

As more clearly described in the following, separation means acts on the fixed ringlike element 51; it includes a partition 57 standing upright from the fixed ringlike element across the unloading opening 53 and close to the edge of the rotatable base 50.

A curvilinear adjustment member 58 the height of which is substantially equal to that of partition 57 is fulcrumed on the fixed ringlike element 51 through a pivot pin 59 integral and perpendicular with the latter. The adjustment member 58 extends towards the partition 57 in the direction of the rotation performed by the base 50 during operation of the metering device 13.

As more clearly shown in FIG. 4, adjustment means is associated with the adjustment member 58; the adjustment means includes a finger 60 engaging with an elongated hole 61 located in the adjustment member 58. Finger 60 is eccentrically engaged with a stem 61 rotating about its own vertical axis. In this way an angular rotation of stem 61 brings about a displacement of the adjustment member 58 about pivot 59 which results in the free end of the adjustment member 58 moving close to or away from partition 57. In this way it is possible to meter the amount of pasta which is thrusted into the unloading opening 53 through a narrow passageway 63 created between the free end of the adjustment member 58 and said partition 57.

A pushing element 64 is associated with each containing compartment 54; it is slidably engaged along the side walls 55 and exactly at the base of the same where horizontal millings are machined. Spring means acts on each pushing element 64 in order to push the same towards the fixed ringlike element 51. Said spring means consists of a rod 66 rotatably engaged, at the opposed ends thereof, to the rotatable base 53 and to a plate 67 integral to the containing compartments 54. The rod 66 has an intermediate threaded portion 66a along which an adjustment disc 68 carrying pulling springs 69 is engaged. Said springs, by their ends opposite the disc 68 act on respective cranked levers 70 each of them being fulcrumed on a pivot pin 71 extending between the side walls 55 of a corresponding compartment 54.

In this way the amount of pasta loaded into each compartment 54, by pouring off the standard content of a packet for example, is submitted to a compacting pressure by the corresponding pushing element 64. On the rotatable base 50 also acts operating means comprised of a lever 72 which is caused to rotate by the reduction means 14 and cyclically engages, through a roller 73 rotatably engaged at a free end thereof, radial cavities 74 located on the lower face of the rotatable base 50. In this manner, by each travel performed by roller 73 according to the circumference shown in dotted line at 73' in FIG. 2, the rotatable base 50 undergoes an angular displacement of $$\frac{360°}{\text{No. of compartments}}.$$

During this displacement, before the corresponding department 54 reaches the unloading opening 53, the displacement of pasta contained therein is interferred by the presence of the adjustment member 58 causing the separation from the peripheral wall 56 of the entire compact block formed by pasta within the compartment 54.

In the last portion of angular displacement, partition 57 carries out the separation of a metered amount of pasta from the above mentioned block. The quantity intended for each dose depends upon the positioning of the adjustment member 58. In more detail said dose first undergoes a clear separation from the block of pasta along the whole height thereof, while still keeping a certain degree of verticality and compactness controlled by the walls of partition 57 and adjustment member 58. The value of said separation is determined by the thickness of partition 57.

When the metered amount of pasta is brought onto the unloading opening 53, it loses its compactness and drops into the containing chamber 8 in an orderly way.

After the above description the operating cycle of the apparatus in question is as follows.

It is supposed that the containing compartments 54 have already been filled with pasta to be cooked and that the electrical resistor 33 has already carried out the heating of water in boiler 7 until a pressure of 4 to 6 atm and a temperature of 130° C. to 150° C. have been reached in said boiler 7. When an electric circuit is closed by manually or automatically operating a switch not shown, the closing valve 15 which is normally closed opens. As a result the first reduction means 14 associated with the metering device 13 is sequentially operated. The latter therefore carries out the introduction of a predetermined dose of pasta into the containing chamber 8, at the same instant in which valve 15 completely opens. During this step, as clearly seen in the figures, the dose of pasta drops vertically into the containing chamber 8 and is homogeneously distributed according to the whole section of the containing chamber 8.

Immediately after the dropping of said dose the closing of valve 15 is automatically caused, preferably upon command of a microswitch operated by lever 72. The valve closing in turn controls: opening of the first shutoff valve 21, closing of the second shutoff valve 22, start of pump 35, as well as operation of electrical resistor 33, when it is not operating yet. Under this situation, water contained in boiler 7 is pushed into the containing chamber 8 through the outflow duct 19 and diffuser 19b being first converted into saturated wet vapour, due to the difference in pressure existing between boiler 7 and containing chamber 8.

In an original manner, the expansion of vapour in the containing chamber 8 is suitably controlled and restrained not only by diffuser 19a, but also by pasta which is disposed adjacent the diffuser 19a in the form of a filter bed. In this way it is advantageously possible to introduce water under a relatively high pressure into the containing chamber 8, without any risk of forming overheated vapour. In fact overheated vapour could only be produced if fluid flowing into the containing chamber 8 would have the possibility of freely expanding.

Water and vapour flowing into the containing chamber 8 rapidly impregnate pasta thus causing the softening of the same. Advantageously, the high pressure created inside the containing chamber 8 causes pasta to be homogeneously impregnated before the occurrence of the subsequent softening. Should not this be the case, pasta could not be homogeneously impregnated because the softening thereof would cause the closure of pores and intermolecular spaces that have to be passed through by the fluid for impregnating purposes. The configuration of the containing chamber 8 and the disposition thereof inside boiler 7 cause the containing chamber 8 to be filled with water and vapour without any heat exchange with the outside taking substantially place.

The filling step of the containing chamber 8 being over, the third reduction means 24 is operated upon command of a timer suitably regulated according to a time in the range of 20 to 40 seconds from the preceding operation of the combined-effect valve 11. The third reduction means 24 causes the first shutoff valve 21 to be closed and, simultaneously, the second shutoff valve 22 to be opened. Under this situation both food and water with vapour surrounding the food and being absorbed by it are ejected into the pause chamber 9 by effect of pressure existing in the containing chamber 8.

While pasta and fluid are conveyed from the containing chamber 8 into the pause chamber 9, water and vapour which during the preceding step had impregnated the food are ejected from the food itself due to the occurrence of changes in pressure during the specified conveyance.

When pasta comes out of the passage port 20 at high speed, it encounters diffuser 49 which, by suitably deviating the trajectory thereof, arranges the same so that, after dropping onto the movable cover 40, it appears homogeneously distributed over the whole surface thereof.

Subsequently pasta is allowed to pause in chamber 9, where it is separated from vapour and water in excess. In greater detail, vapour, rising along the pause chamber 9 nd passing through filter 10, delivers heat to the first pre-heating section 37 so that it condenses almost completely and falls down onto the bottom of chamber 9 in the form of water. The non-condensed excess vapor is evacuated through a pipe 75 leading off to the outside of the apparatus. The excess water is on the contrary eliminated through the water gauge pipe 48 suitably disposed in the water trap 47.

During its staying in chamber 9, pasta reabsorbs part of the cooking water with which it is allowed to lie. While reabsorbing water, pasta goes on cooking which causes the mineral substances contained therein (that is phosphorus, potassium, magnesium, calcium, sodium, chlorine) to be converted into mineral salts.

Before pasta has completely absorbed the cooking water, the movable cover 40 is lowered. In greater detail, the lowering of movable cover 40 is carried out by a fourth reduction means 45, upon command of a further timer suitably regulated according to a time ranging from 20 to 40 seconds from the moment in which the ejection of pasta from the pause chamber 9 took place.

The lowering of cover 40 causes the food and the cooking water not yet absorbed to be transferred into a vessel 76 suitably disposed under the pause chamber 9, within a recess 77 provided in apparatus 1.

Afterwards vessel 76 can be withdrawn from the apparatus in order to allow dressing to be put thereon by a final consumer.

While dressing is applied, cooking of pasta is brought to an end by means of the total absorption of cooking water (and added dressing) to which corresponds the organoleptic transformation of gluten present in said pasta.

The invention attains the intended purposes.

It is to be noted in fact that, as compared to similar apparatus involving more complicated structures which, on the other hand, are incomplete as regards the control of thermodynamic processes during operation, the present invention enables a very compact and simple construction, consisting of a number of component pieces as much reduced as possible and ensuring a great reliability. Furthermore, the recovery of heat carried out by coil pipes 37 and 38, which on the other hand are indispensable to thermal stability of the machine and for eliminating vapour from the surrounding atmosphere, allows electric energy to be remarkably saved.

In addition and above all, the apparatus in question, by virtue of the devices adopted therein carries out the cooking of pasta within much more reduced times with respect to those of the known art and in a better manner.

Modifications and variations are possible in order to conform the apparatus to the different requirements and to the type of food to be cooked, without departing from the scope of the present invention, as defined in the appended claims.

What is claimed is:

1. An apparatus for the fast cooking of pasta and the like comprising:

a containing chamber vertically extending inside a boiler;

an outflow duct extending from an upper end of the boiler and leading off to a lower part of the containing chamber;

at least one shutoff valve disposed along the outflow duct;

a pause chamber closed at the bottom by a movable cover;

a passage port extending from the lower part of the containing chamber to the pause chamber;

at least a second shutoff valve designed to selectively close open the passage port;

at least a delivery pump to deliver water to said boiler;

a delivery pipe bringing the pump into communication with a lower part of the boiler, said pipe having a first preheating section extending internally at an upper part of the pause chamber and a second pre-heating section extending in an upper part of the boiler;

a metering device to introduce a predetermined amount of pasta into the containing chamber at the beginning of each operating cycle carried out by the apparatus.

2. The apparatus as claimed in claim 1, further comprising means for constantly maintaining said boiler full of water at a temperature ranging from 130° C. to 150° C. and at a pressure of 4 to 6 atm.

3. The apparatus as claimed in claim 1, wherein said containing chamber is located inside said boiler and has a first wall portion in common with the boiler body and a second wall portion extending inside the boiler, said second wall portion having a thinner thickness than the first wall portion.

4. The apparatus as claimed in claim 1, wherein the containing chamber is provided with a base wall spaced apart from the boiler bottom by a distance equal to at least one fifth of the height of said boiler.

5. The apparatus as claimed in claim 4, wherein said first shutoff valve and said second shutoff valve are provided with respective movable parts rigidly connected to each other and simultaneously operable in order to cause the opening of the outflow duct and closing of the passage port respectively, and viceversa.

6. The apparatus as claimed in claim 1, further comprising at least a substantially network-structured filter extending across the pause chamber according to a plane disposed above the passage port.

7. The apparatus as claimed in claim 1, further comprising a substantially cylindrical diffuser disposed upright in the pause chamebr in front of the passage port.

8. The apparatus as claimed in claim 1, further comprising at least a safety valve with which a discharge duct is associated, said duct bringing the boiler into communication with the pause chamber.

9. The apparatus as claimed in claim 1, wherein said first shutoff valve comprises:
 a valve body crossed by said outflow duct and provided with a sealing housing of truncated conical form extending across the outflow duct;
 a frusto-conical element rotatably disposed in said frusto-conical sealing housing and provided with a transverse through hole which is disposed in alignment with the outflow duct in order to open the fluid communication along the latter;
 two presser elements acting on the bigger and smaller bases respectively of the frusto-conical element;
 at least two tie rods connecting said presser elements to each other, longitudinally crossing the frusto-conical element at diametrically opposed positions;
 a locating plate fastened to the valve body in front of the bigger base of said frusto-conical element;
 a compression spring acting between the locating plate and the presser element which acts on the bigger base of the frusto-conical element.

10. The apparatus as claimed in claim 1, further comprising a closing valve which is normally closed, associated with the containing chamber and interlocked to control means to open the closing valve when operation of the metering device occurs and to close it when a metered amount of pasta has been introduced into the containing chamber.

11. The apparatus as claimed in claim 1, wherein said metering device comprises:
 a rotatable base of circular form, rotatably engaged according to its own axis with the top of the apparatus;
 a fixed ringlike element surrounding the rotatable base and provided with an unloading opening disposed above the containing chamber;
 a plurality of containing compartments distributed all over the circumference of the rotatable base according to a predetermined pitch, each of said compartments being designed to contain a predetermined amount of pasta;
 a plurality of pushing elements, each of them being associated with one of said containing compartments;
 spring means acting on the pushing elements to thrust them towards the fixed ringlike element;
 control means intended to rotate the rotatable base according to a predetermined angle corresponding to the distribution pitch of said containing compartments on the rotatable base;
 separation means acting on said unloading opening to separate, following the rotation imparted to the rotatable base by said control means, a predetermined dose of pasta from the amount provided in a corresponding containing compartment bringing said dose above the unloading opening.

12. The apparatus as claimed in claim 4, wherein said separation means comprises a partition standing upright from the fixed ringlike element across the unloading opening adjacent the edge of said rotatable base, said containing compartments being provided, at the lower part thereof, with opened areas to allow pasta to be engaged by said partition.

13. The apparatus as claimed in claims 11, and 12, wherein said metering device further comprises an adjustment member one end of which is rotatably engaged, according to a vertical axis, with the fixed ringlike element, said member extending towards said partition following the rotation of the rotatable base and terminating in a free end disposed alongside the separation element, adjustment means being provided in order to rotate the adjustment member according to its own pivoting axis, giving it a predetermined positioning relative to said partition.

* * * * *